United States Patent
Yang (10) Patent No.: US 6,597,159 B2
(45) Date of Patent: Jul. 22, 2003

(54) PULSE WIDTH MODULATION CONTROLLER HAVING FREQUENCY MODULATION FOR POWER CONVERTER

(75) Inventor: Ta-yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 0 days.

(21) Appl. No.: 09/931,641

(22) Filed: Aug. 15, 2001

(65) Prior Publication Data
US 2003/0034764 A1 Feb. 20, 2003

(51) Int. Cl.[7] ................................................. G05F 1/40
(52) U.S. Cl. ........................................ 323/283; 323/284
(58) Field of Search ................................ 323/283, 284, 323/351; 363/21.1, 21.18, 41

(56) References Cited

U.S. PATENT DOCUMENTS

| | | | |
|---|---|---|---|
| 4,179,647 A | * 12/1979 | Cummins et al. | ............ 320/127 |
| 5,515,257 A | 5/1996 | Ishii | |
| 5,568,044 A | 10/1996 | Bittner | |
| 5,640,317 A | * 6/1997 | Lei | .............................. 363/49 |
| 5,745,352 A | 4/1998 | Sandri et al. | |
| 5,747,977 A | 5/1998 | Hwang | |
| 5,790,391 A | 8/1998 | Stich et al. | |
| 5,903,138 A | 5/1999 | Hwang et al. | |
| 5,929,618 A | * 7/1999 | Boylan et al. | ............... 323/282 |
| 6,100,675 A | 8/2000 | Sudo | |
| 6,157,182 A | 12/2000 | Tanaka et al. | |

* cited by examiner

Primary Examiner—Adolf Deneke Berhane
(74) Attorney, Agent, or Firm—J.C. Patents (57) ABSTRACT

The invention provides a frequency modulation for a PWM controller to reduce the switching frequency in the light load and no load conditions. The frequency modulation is achieved by moderating the trip-point voltage of the oscillator. Increasing the trip-point voltage reduces the switching frequency. A feedback voltage, which is derived from the voltage feedback loop, is taken as the reference. The sense voltage in the current sense input of the PWM controller represents the information of primary current of the transformer. A sampled voltage is sampled from sense voltage during the PWM signal is turn-off. The trip-point voltage is the function of the feedback voltage and the sampled voltage. A threshold voltage is the sum of the sampled voltage and a constant voltage that define the level for light load condition. Once the feedback voltage is lower than the threshold voltage, the trip-point voltage will increase and switching frequency will reduce. The frequency modulation in the PWM controller can reduce the power consumption of the power supply in light load and no load conditions.

7 Claims, 6 Drawing Sheets

PULSE WIDTH MODULATION CONTROLLER HAVING FREQUENCY MODULATION FOR POWER CONVERTER

FIELD OF INVENTION

The present invention relates to a switching mode power supply, and more particularly to the pulse width modulation (PWM) of the switching mode power supply.

BACKGROUND OF THE INVENTION

Figure 1:
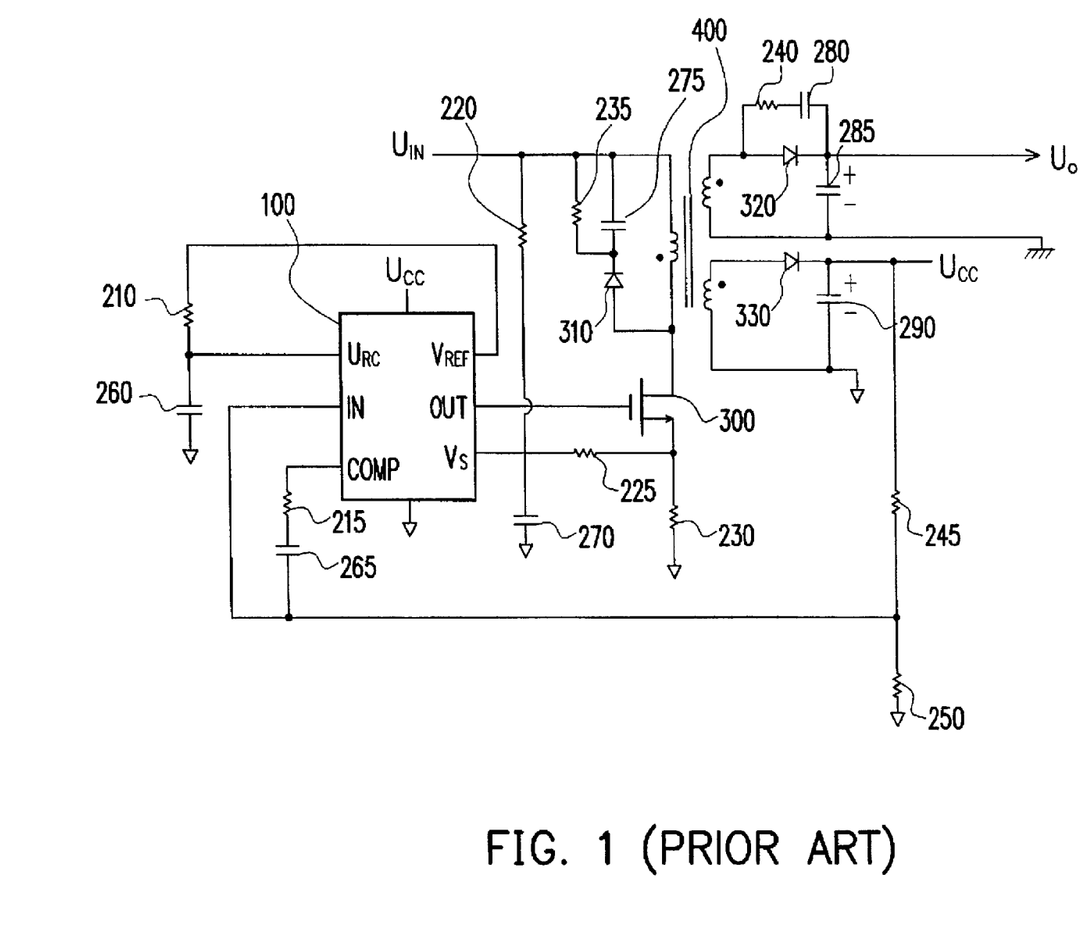
FIG. 1 shows a circuit schematic of the flyback power supply that includes a 3842 PWM controller.

The PWM is a traditional technology used in switching mode power supply to control the output power and achieve the regulation. Most electronic equipments, such as TV, computer, printer, etc., are using the PWM power supply. Based on the restriction of environmental pollution, computers and other equipment manufactures have been striving to meet the power management and energy conservation requirements. The principle of power management is to manage the system to consume power only during its operation, and very little power will be consumed during non-operation (sleep mode). A PWM-control integrated circuit, 3842 family, has been widely used for the power supply in the last decade. It includes 3842, 3843, 3844 and 3845, which build in necessary features to implement a switching power supply. However, it does not include the function of saving energy. With respect to the power supply in a power management application, how to save the power in the no load or light load conditions is a major requirement. Through the frequency modulation in PWM control, this invention reduces power consumption in light load and no load conditions. FIG. 1 shows a circuit schematic of the flyback power supply that includes a 3842 PWM controller 100. A transistor 300 switches a transformer 400. A time constant resistor 210 and capacitor 260 assign the switching frequency for variance of applications. When the transistor 300 is turned off, the leakage inductance of transformer 400 keeps the current, which has been flowing in it constantly for some short time. The part that current continues to flow into the slowly off-switching transistor 300 and the rest of that current flows into a capacitor 275 through a diode 310. A resistor 235 dissipates the energy that is charged in the capacitor 275. The diode 310, resistor 235, and capacitor 275 form a clamp circuit to reduce the leakage inductance spike and avoid the transistor 300 breakdown. At the instance of transistor 300 is switched on, an output rectifier 320 is switched off, and there is an exponentially decaying oscillation or 'ring' will come out. The ring is at a frequency determined by the inherent capacity of the off-switching rectifier 320 and the value of secondary inductance of the transformer 400. The amplitude and duration of the ring are determined by the output current and the reverse recovery times of the rectifier 320. The ring will cause RFI problem and can easily be eliminated by a snubber resistor 240 and a snubber capacitor 280 across the output rectifier 320. The major factors affecting the loss of the power conversion in the light load condition are listed as below:

(1) The switching loss of the transistor 300, $P_Q$ can be expressed $$(t_{ol}/T)(\int_0^{tol} V_Q \times Ip \, dt),$$

or $$P_Q = Fs \times t_{ol} \times (\int_0^{tol} V_Q \times Ip \, dt),$$

where T is switching period, Fs is the switching frequency and $t_{ol}$ is the duration of overlap of voltage $V_Q$ and current Ip. Ip is the primary current of the transformer 400 and $V_Q$ is the voltage across the transistor 300.

(2) The switching loss of output rectifier 320 and 330, $P_D$ can be expressed $$(t_{rr}/T)(\int_0^{trr} Vd \times Id \, dt),$$

or $$P_D = Fs \times t_{rr} \times (\int_0^{trr} Vd \times Id \, dt),$$

where $t_{rr}$ is the reverse recovery time of the rectifier. The Vd is the voltage across the rectifier when it is switch-off. Id is limited by the secondary inductance of the transformer 400.

(3) The core loss of transformer 400, $P_T$, it is proportional to flux density Bm, core volume Vv and the switching frequency Fs.

$$P_T = K_0 \times Bm \times Vv \times Fs,$$

where $K_0$ is a constant.

(4) The power loss of snubber, $P_R$ is stated as $$P_R = (\tfrac{1}{2}) \times C \times Vd^2 \times Fs,$$

where C is the capacitance of the snubber, such as capacitor 280.

(5) The power loss of leakage inductance, $P_L$ can be stated by $$P_L = (\tfrac{1}{2}) \times Lt \times Ip^2 \times Fs,$$

where the Lt is the primary leakage inductance of transformer 400. The resistor 235 dissipates the energy that is produced by the Lt.

We can find that all of the losses are in direct proportion to the switching frequency Fs. However the power supply is designed to operate in a higher frequency to shrink the size, especially the volume of the transformer. To prevent the saturation of the transformer, the voltage-time ratio (Vin×Ton) has to be managed to limit the flux density Bm of the transformer.

$$Bm = (Vin \times Ton)/(Np \times Ae),$$

where Vin is the input voltage of the power supply, Ton is the turn-on time, Np is the primary turn number of the transformer, Ae is the cross of the transformer. The value of (Np×Ae) represents the size of the transformer. A higher frequency can earn a lower maximum Ton and a smaller transformer.

Take the flyback power supply as an example; the output power Po is equal to $(\tfrac{1}{2}T) \times Lp \times Ip^2$, where Lp is the primary inductance of the transformer 400. Since Ip=(Vin/Lp)×Ton, it can be seen quantitatively as $$Po = (Vin^2 \times Ton^2)/(2 \times Lp \times T).$$

Figure 2:
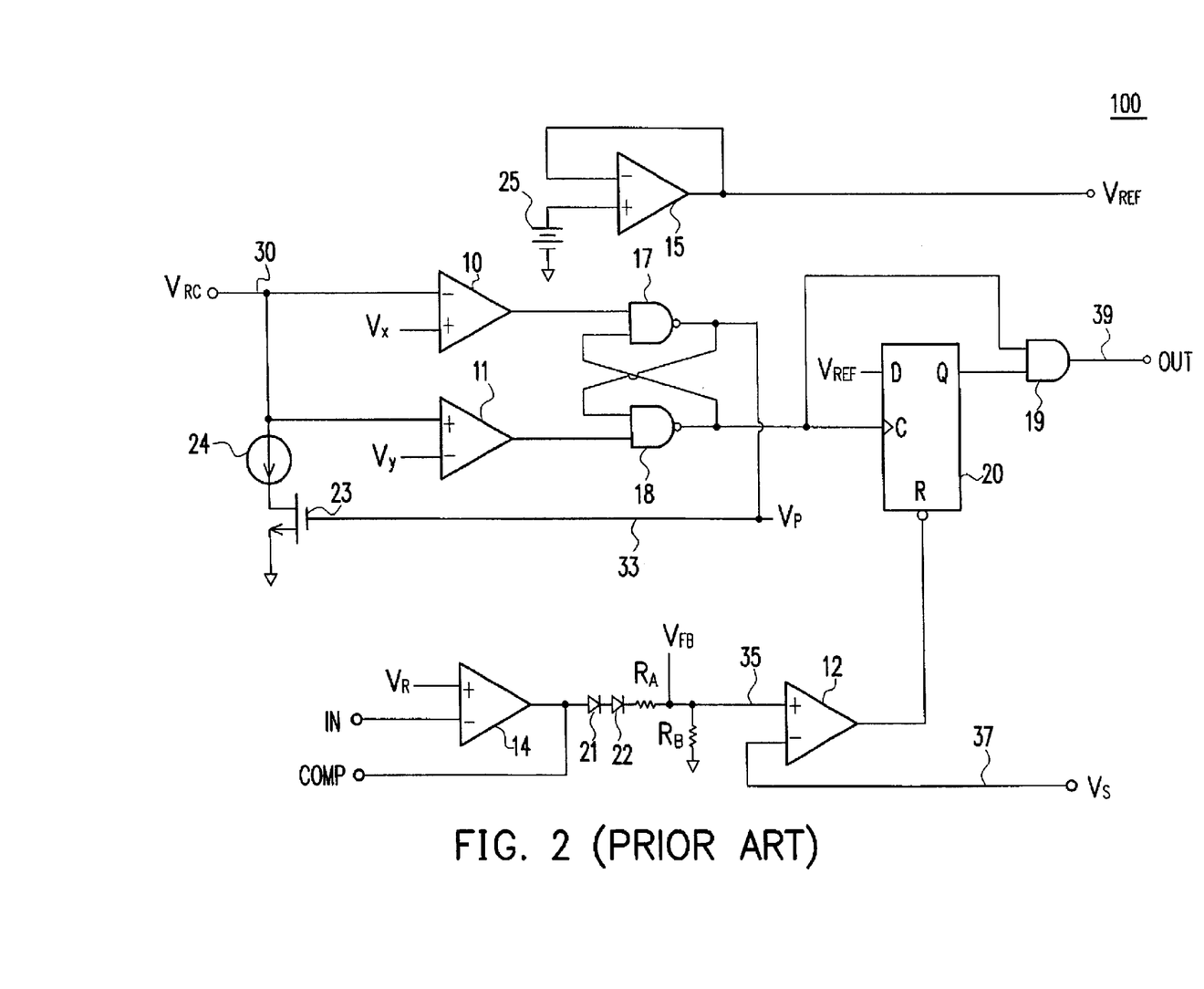
FIG. 2 shows the circuit schematic of 3842 PWM-controller.
Figure 3:
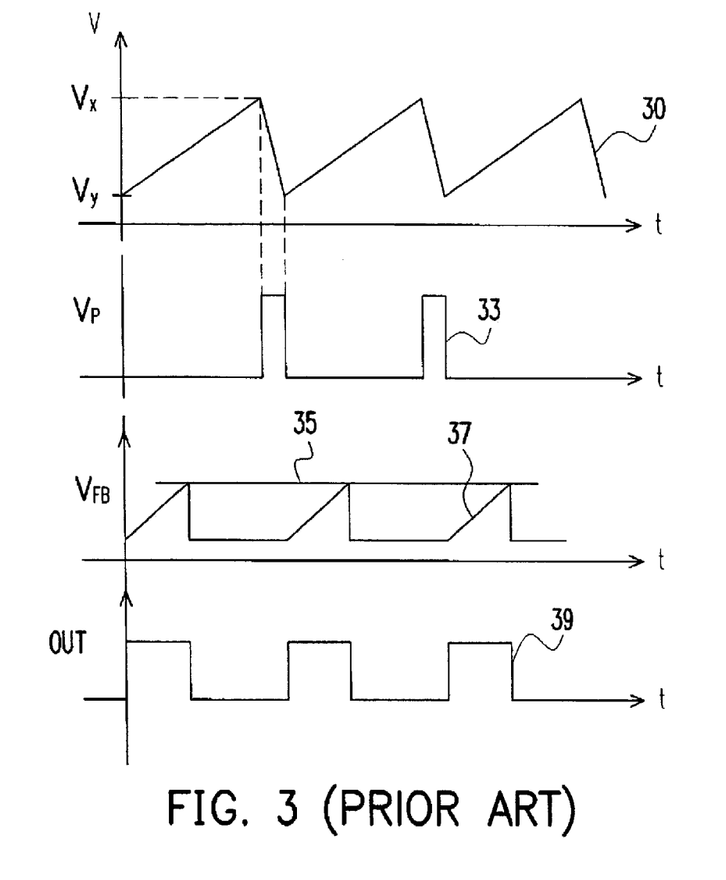
FIG. 3 displays the waveform for the circuit in FIG. 2.

This is seen from that equation, during the light load condition, Ton is short and obviously allows us to widen the T (lower the Fs). The power consumption of the power supply is dramatically reduced in response to the decrease of the switching frequency Fs in the light load condition and no load condition. FIG. 2 shows the circuit schematic of 3842 PWM-controller. The resistor 210 in FIG. 1 is connected from pin $V_{RC}$ to a reference voltage $V_{REF}$ and the capacitor 260 in pin $V_{RC}$ is connected to ground. FIG. 3 displays the waveform for the circuit in FIG. 2. The voltage across capacitor 260 is charged and reaches the trip-point of the comparator 10 (trip-point voltage Vx). The comparator 10 and the NAND gates 17,18 will generate a discharge signal Vp to turn on the transistor 23 that discharges the capacitor 260 via a constant current sink 24. The phenomenal of the discharge is continuous until the voltage of capacitor 260 lower than the low-point voltage Vy, in which a comparator 11 is enabled. The resistor 210, capacitor 260, comparators 10, 11, current sink 24, transistor 23, and NAND gates 17, 18 form an oscillator and generate a constant frequency signal to clock on the flip-flop 20. The comparator 12 resets the flip-flop 20 when the voltage in the pin Vs is higher than the feedback signal $V_{FB}$. The resistor 230 converts the current information of the transformer 400 to a voltage signal, which is a ramp signal, and the input voltage Vin and the inductance of transformer 400 determine its slope $$V_{R230} = R_{230} \times (Vin \times Ton)/Lp.$$

The voltage in resistor 230, $V_{R230}$, is inputted to the pin Vs via the filter of a resistor 225 and a capacitor 270. The feedback signal $V_{FB}$ is derived from the output of an error amplifier 14, which is attenuated by resistors $R_A$, $R_B$ and the level shift diodes 21, 22. The voltage level of the $V_{FB}$ is dominantly decided by the output power through the control of voltage feedback loop. The discharge time of capacitor 260, which can be demonstrated by Vp when it is high, determines the dead time of the PWM signal 39 that decides the maximum duty cycle of PWM controller 100. The PWM signal will be switched off as long as the voltage of Vs is higher than $V_{FB}$, thus the maximum $V_{FB}$ is set as 1V to limit the maximum output power. Since a higher power will be output in response to a higher Vin when Vs>1V, a resistor 220 is connected from Vin to pin Vs to compensate the limit for over-power conditions. The compensation added to the pin Vs causes the voltage of $V_{FB}$ to increase automatically through the voltage feedback loop to keep the same Ton and the same output power in the normal operation conditions. For that reason, the voltage of $V_{FB}$ is not only determined by the output power but also affected by a DC bias in pin Vs. According to that observation, the switching frequency Fs can be reduced in response to a low $V_{FB}$ voltage for light load and no load conditions. In addition, the DC bias in pin Vs has to be offset in order to take the reference of $V_{FB}$. One object of the invention is to add the feature of frequency modulation into the traditional 3842 PWM controllers. Thereafter, without redesigning, most of the power supplies equipped with the 3842 are available for saving energy in light load and no load conditions.

SUMMARY OF THE INVENTION

The invention provides a frequency modulation for a PWM controller to reduce the switching frequency in the light load and no load conditions. The frequency modulation is accomplished by moderating the trip-point voltage of the oscillator. Increase in trip-point voltage reduces the switching frequency. The feedback voltage derived from the output of the error amplifier in the voltage feedback loop is taken as an indication. The sense voltage is the voltage of the current sense input of the PWM controller, which represents the information of primary current of the transformer. A sampled voltage is sampled from sense voltage during the PWM signal is turned off. The trip-point voltage is a function of the feedback voltage and the sampled voltage. A threshold voltage is the sum of the sampled voltage and an entry voltage. The entry voltage is a constant that defines a level of light load output power, in which the switching frequency starts to reduce. Once the feedback voltage is lower than the threshold voltage, the trip-point voltage will increase and switching frequency will reduce. When the feedback voltage is higher than the threshold voltage, the trip-point voltage is determined by a primary voltage, which decides the switching frequency in the normal load and high load conditions. The threshold voltage subtracts the feedback voltage is then to be magnified by an amplifier. Via a limiter, the amplified signal is summed with the primary voltage and turned into the trip-point voltage. The limiter clamps the amplified signal between zero and an upper-limit voltage. The sum of the primary voltage and the upper-limit voltage decide the lowest switching frequency of the power supply.

Advantageously, the frequency modulation in the PWM controller can reduce the power consumption of the power supply in light load and no load conditions. And the PWM operations in normal load and high load conditions are as usual and not affected by the frequency modulation.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 4:
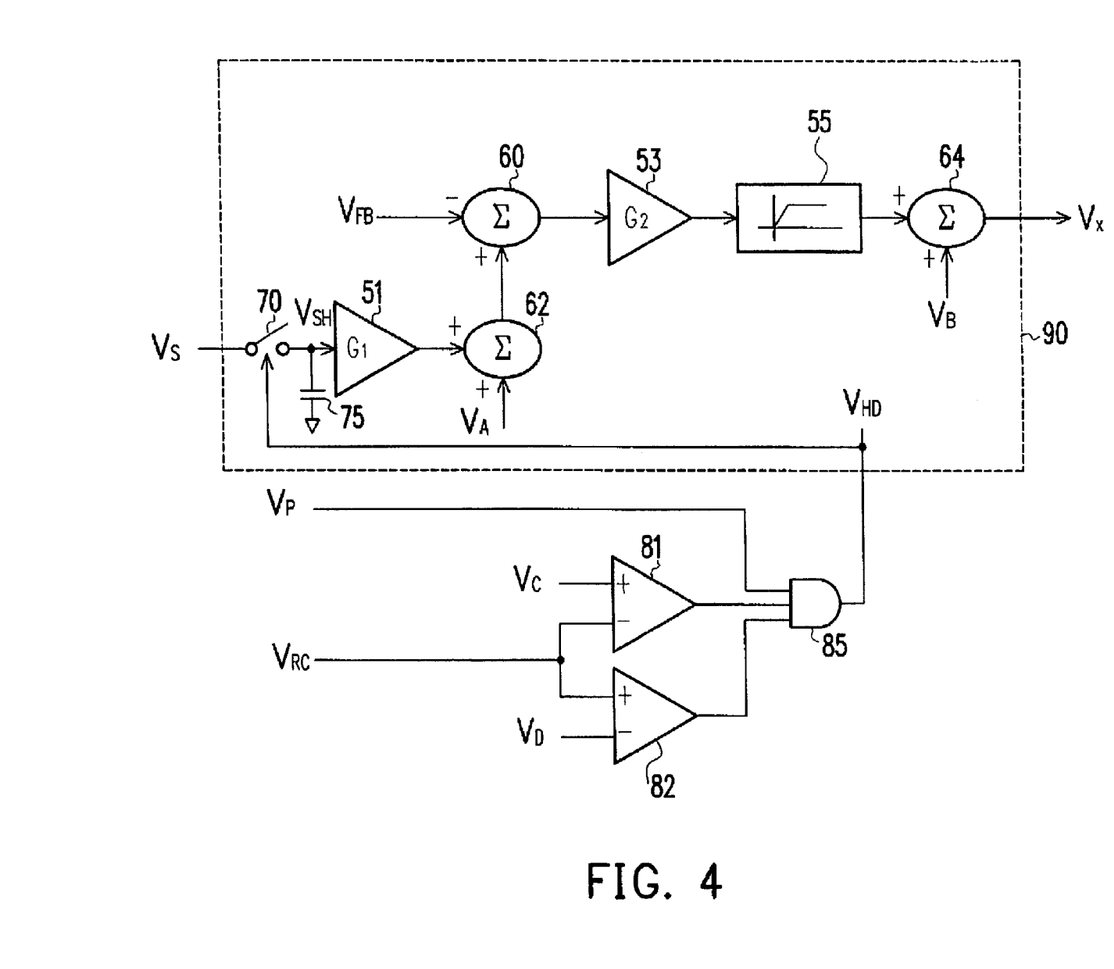
FIG. 4 schematically shows the block diagram of the trip-point voltage composer for the frequency modulation according to one embodiment of the present invention.

FIG. 4 schematically shows the block diagram of the trip-point voltage composer for the frequency modulation according to one embodiment of the present invention.

The sense voltage, a voltage of current sense input, is sampled and held in a capacitor 75 by a sample-hold pulse $V_{HD}$. An amplifier 51 with gain G1 amplifies the sampled voltage $V_{SH}$ that is stored in capacitor 75. The output of the amplifier 51 adds with an entry voltage $V_A$ via an adder 62. Through an adder 60, the output of the adder 62 subtracts the feedback voltage $V_{FB}$. An amplifier 53 with gain G2 amplifies the output of the adder 60. The output of the amplifier 53 is linked to the input of a limiter 55. The output of the limiter 55 is added with a primary voltage $V_B$ by an adder 64, in which the primary voltage $V_B$ decides the switching frequency in the normal load and high load conditions. The output of the adder 64 is the trip-point voltage Vx for the oscillator of the PWM controller. The limiter 55 can be defined to be $$0V \leq Vlimit \leq Vup$$

The input of the limiter 55 is truncated, its output Vlimit is clamped from zero to an upper-limit voltage Vup. The trip-point voltage Vx is equal to $$Vlimit = (V_A + G1 \times V_{SH} - V_{FB}) \times G2;$$

$$Vimit = 0V \text{ if } Vimit \leq 0V;$$

and $$Vlimit = Vup \text{ if } Vimit \geq Vup;$$

$$Vx = V_B + Vlimit;$$

The gain G2 decides the slope of the reduction of switching frequency corresponding to the decrease of $V_{FB}$. The sample-hold pulse $V_{HD}$ is enabled and the switch 70 is switched on during the PWM signal is turned off. The sample-hold pulse $V_{HD}$ is the output of an AND gate 85. The inputs of the AND gate 85 include the discharge signal Vp of the PWM controller, the output of a comparator 81 and the output of a comparator 82. The pin $V_{RC}$ of the PWM controller is connected to the negative input of the comparator 81 and the positive input of the comparator 82. The positive input of the comparator is a constant voltage Vc. The negative input of the comparator 82 is a constant voltage $V_D$. The Vc and $V_D$ are given by $V_B > Vc > V_D > Vy$.

Figure 5:
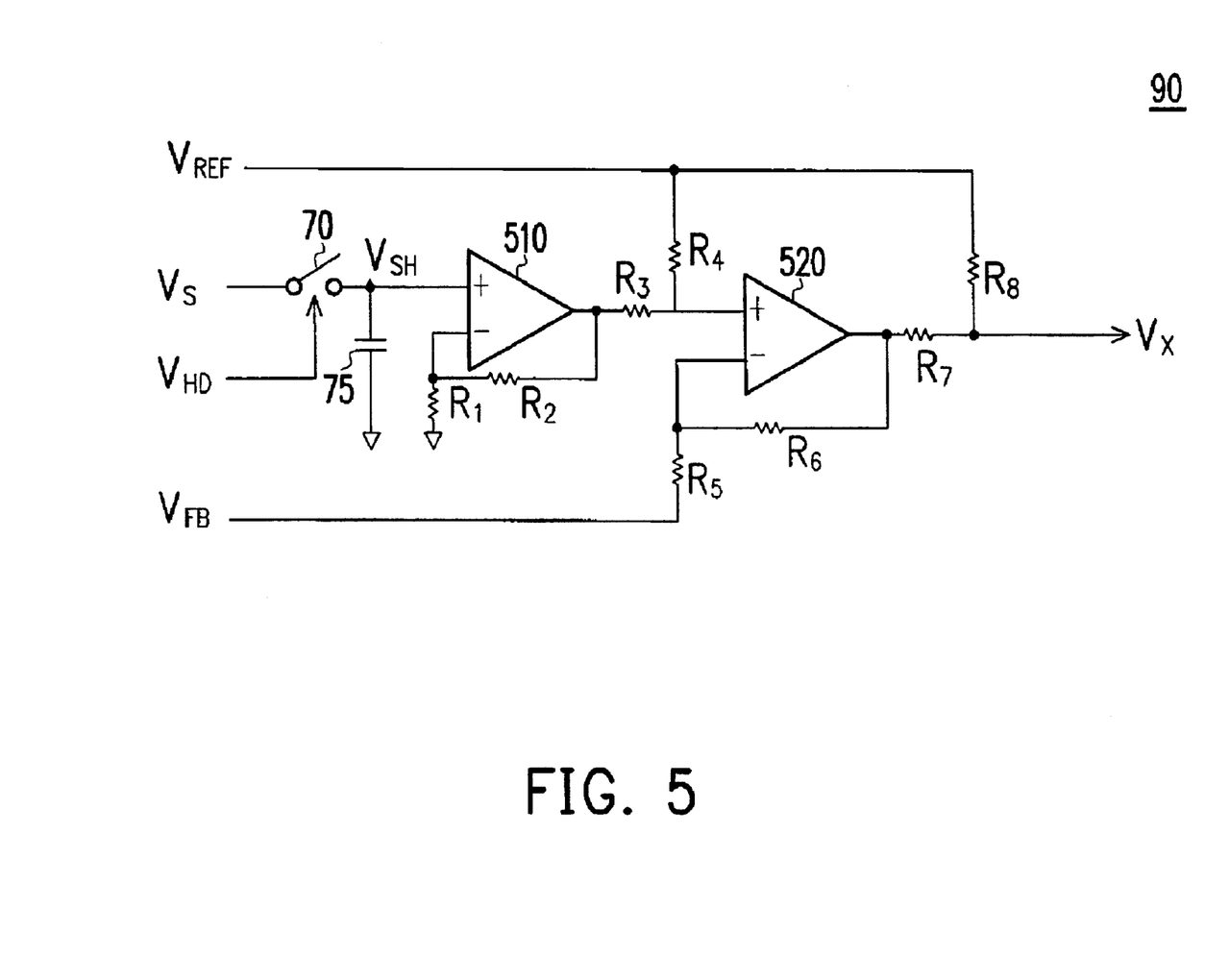
FIG. 5 shows an exemplary circuit of the trip-point voltage composer as shown in FIG. 4.

FIG. 4 shows an exemplary circuit of the trip-point voltage composer for the frequency modulation as shown in FIG. 3. The capacitor 75 that holds the voltage $V_{SH}$ connected to the positive input of an operational amplifier (op-amp) 510. A resistor R1 is tied from the negative input of the op-amp 510 to ground. A resistor R2 is disposed between the negative input and the output of the op-amp 510. The output of the op-amp 510 is linked to the positive input of an op-amp 520 via a resistor R3. The op-amp 520 has an open collector output. A resistor R4 is connected from the positive input of the op-amp 520 to the reference voltage $V_{REF}$. The feedback voltage $V_{FB}$ is input to the negative input of the op-amp 520 through a resistor R5. A resistor R6 is connected between the negative input and the output of the op-amp 520. The trip-point voltage Vx is generated from the output of op-amp 520 via a resistor R7. A resistor R8 is connected from the trip-point voltage Vx to the reference voltage $V_{REF}$. Thereby, the trip-point voltage Vx can be stated as $$V_{R4} = V_{REF} \times [R3/(R3+R4)] + V_{SH} \times [(R2+R1)/R1];$$

When the output of op-amp 520 is defined as Vlimit, we obtain $$Vlimit = V_{R4} \times [(R6+R5)/R5] - V_{FB} \times (R6/R5);$$

$$\approx (R6/R5) \times (V_{R4} - V_{FB})$$

$$\approx (V_A + G1 \times V_{SH} - V_{FB}) \times G2;$$

Where $$V_A = V_{REF} \times [R3/(R3+R4)];$$

$$G1 = [(R2+R1)/R1];$$

$$G2 = (R6/R5);$$

The trip-point voltage Vx is $$Vx = V_B + Vlimit;$$

Where the $$V_B = V_{REF} \times [R7/(R7+R8)]$$

Since the output of the op-amp is open collector, the maximum Vlimit is limited and the maximum Vx is $$Vx(max.) \approx V_{REF} \times [(R5+R6+R7)/(R5+R6+R7+R8)];$$

Figure 6:
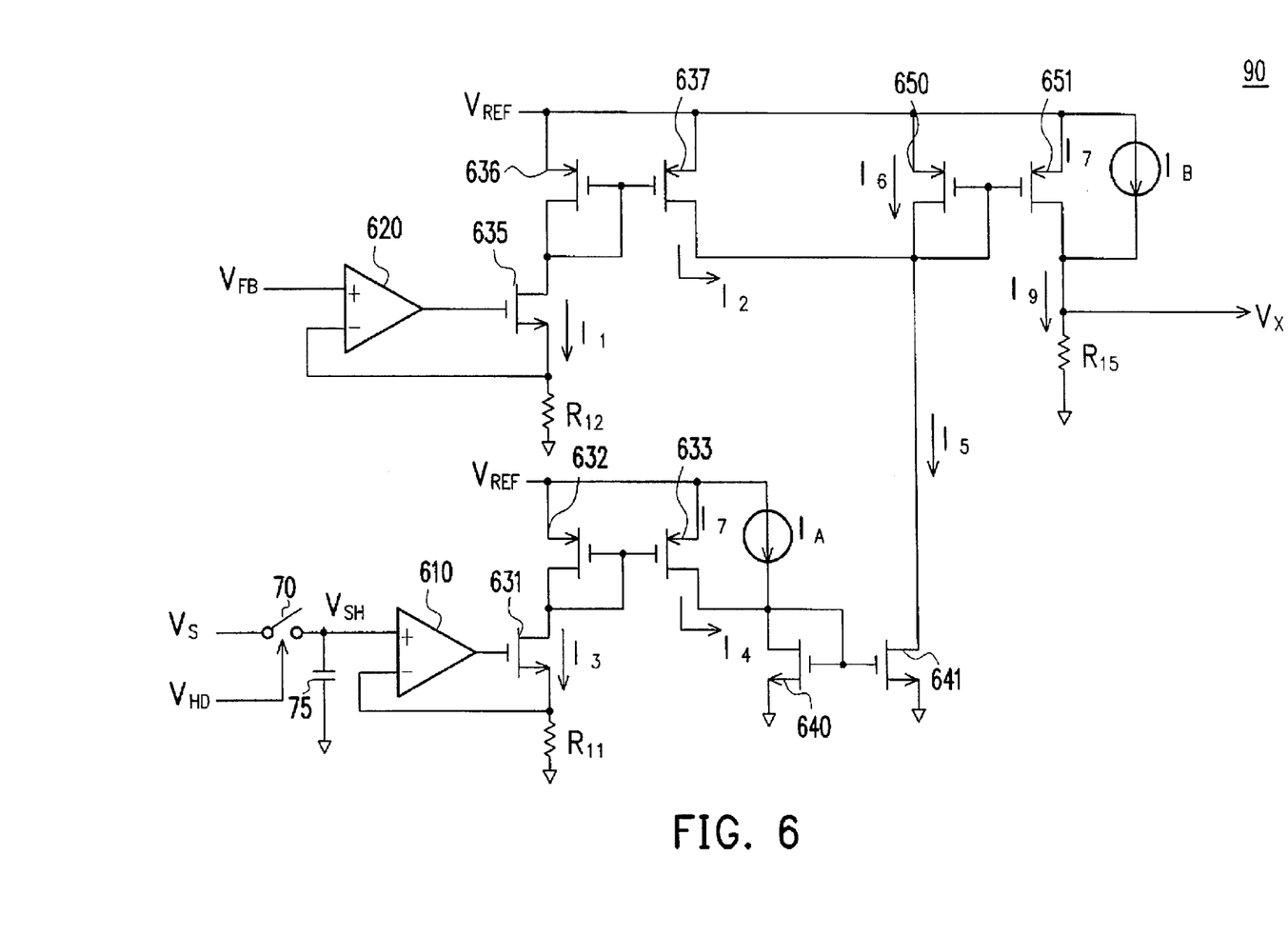
FIG. 6 shows another exemplary circuit of the trip-point voltage composer as shown in FIG. 4.

FIG. 5 shows another exemplary circuit of the trip-point voltage composer for the frequency modulation as shown in FIG. 3. The capacitor 75 is connected to the positive input of an op-amp 610. The output of the op-amp 610 drives a transistor 631 to generate a current I3. The source of the transistor 631 is tied to the ground through a resistor R11. The negative input of the op-amp 610 is connected to the source of the transistor 631. The drain of the transistor 631 is linked the drain and the gate of a transistor 632. The transistor 632 associated with a transistor 633 forms a current mirror. The gate of transistor 633 is connected to the gate of transistor 632. The source of transistor 632 and 633 are tied together and then connected to the reference voltage $V_{REF}$. A current I4 in the drain of transistor 633 associated with a constant current source $I_A$ is output to a current mirror that is constructed by transistor 640 and 641. The input of this current mirror is the drain of transistor 640, which is tied together with the gates of transistors 640, 641. The sources of transistors 640 and 641 are grounded. The drain of the transistor 641 sinks a current I5. The feedback voltage $V_{FB}$ is tied to the positive input of an op-amp 620. The output of the op-amp 620 drives a transistor 635 to generate a current I1. The source of the transistor 635 is tied to the ground through a resistor R12. The negative input of the op-amp 620 is connected to the source of the transistor 635. The drain of the transistor 635 is linked to the drain and the gate of a transistor 636. The transistor 636 associated with a transistor 637 forms a current mirror. The gate of transistor 637 is connected to the gate of transistor 636. The sources of transistors 636 and 637 are tied together and then connected to the reference voltage $V_{REF}$. A current I2 in the drain of transistor 637 is linked to the drain of the transistor 641. A transistor 650 and a transistor 651 build a current mirror. The source of transistor 650 and 651 are tied together. The gates of the transistors 650, 651 and the drain of transistor 650 are connected together and then linked to the drain of transistor 641. A current I7 in the drain of transistor 651 associated with a constant current IB is output to a resistor R15. The trip-point voltage is developed by a current I9 in the resistor R15. According to the circuit in FIG. 6, we can find $$I1 = V_{FB}/R12;$$

$$I3 = V_{SH}/R11;$$

$$I6 = I5 - I2;$$

$$I9 = I7 + I_B$$

and $$Vx = I9 \times R15.$$

The output of the current mirrors is given by $$I2 = M1 \times I1;$$

$$I4 = M2 \times I3;$$

$$I5 = M3 \times (I4 + I_A)$$

and $$I7 = M4 \times I6;$$

Then $$Vx = R15 \times \{I_B + M4 \times [M3 \times (I_A + M2 \times V_{SH}/R11) - M1 \times V_{FB}/R12]\};$$

Or $$V_x = R15 \times I_B + M4 \times [R15 \times M3 \times (I_A + M2 \times V_{SH}/R11) - R15 \times M1 \times V_{FB}/R12];$$

And substituting this into $$V_x = V_B + V\text{limit};$$

$$V\text{limit} = (V_A + G1 \times V_{SH} - V_{FB}) \times G2;$$

Where $$V_B = I_B \times R15;$$

$$G2 = M4;$$

$$V_A = M3 \times R15 \times I_A;$$

$$G1 = M3 \times M2 \times (R15/R11) \times V_{SH};$$

and $$M1 \times (R15/R12) = 1.$$

The range of the Vx is clamped between $R15 \times I_B$ and Vlimit (max.)+$R15 \times I_B$. Because the offset of $V_{FB}$ is equal to the $V_{SH}$ (the DC bias of the Vs), the $G1 \times V_{SH}$ is designed to compensate the DC bias of $V_{FB}$. Then, $$V\text{limit (max.)} = M4 \times M3 \times I_A \times R15.$$

As described above, the PWM controller having a frequency modulation of the present invention can reduce the power consumption for the power converter in light load and no load conditions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A PWM controller having a frequency modulation to reduce the switching frequency in a light load condition and a no load condition comprising:

a trip-point voltage composer, providing a modulated trip-point voltage to determine the switching frequency of the PWM controller.

2. A PWM controller having a frequency modulation to reduce the switching frequency in a light load condition and a no load condition as claimed in claim 1, said trip-point composer generates a modulated trip-point voltage, which is a function of feedback voltage derived from the voltage feedback loop of the power supply;

a sensed voltage, which is sampled by a sample switch from the current-sense-input of the PWM controller during the PWM signal of PWM controller is turn-off.

3. A PWM controller having a frequency modulation to reduce the switching frequency in a light load condition and a no load condition as claimed in claim 1, said trip-point voltage determines the switching frequency of the PWM controller, in which the switching frequency is reduced corresponding to the increase of the trip-point voltage.

4. A PWM controller having a frequency modulation to reduce the switching frequency in a light load condition and a no load condition as claimed in claim 2, said feedback voltage determines the trip-point voltage, by following the feedback voltage that is lower than a threshold voltage, the trip-point voltage will start to increase corresponsive to the decrease of the feedback voltage; wherein the entry voltage is a constant for defining the level of light load power and the threshold voltage is the sum of the entry voltage and the sensed voltage.

5. A PWM controller having a frequency modulation to reduce the switching frequency in a light load condition and a no load condition as claimed in claim 1, said trip-point voltage composer has an exemplary circuit comprising:

a sample switch for sampling the voltage in a current-sense-input of the PWM controller, wherein the sample switch is enabled by the sample signal;

a hold capacitor for holding a sensed voltage, which is sampled by the sample switch;

an input-op amplifier, wherein the positive input is connected to the hold capacitor;

a first-buffer resistor associated with a second-buffer resistor to determine the gain for the input-op amplifier, in which the first-buffer resister is connected from the negative input of the input-op amplifier to the ground, and a second-buffer resistor is disposed between the negative input and the output of the input-op amplifier;

an output-op amplifier and a first-output resistor wherein the output of the output-op amplifier via the first-output resistor generates the modulated trip-point voltage for the PWM controller;

a first-limit resistor connected between the output of the input-op amplifier and the positive input of the output-op amplifier;

a second-limit resistor connected from the positive input of the output-op amplifier to the reference voltage of PWM controller;

a first-gain resistor associated with a second-gain resistor to determine the gain for the output-op amplifier, wherein the first-gain resistor is connected between the negative input of the output-op amplifier and the feedback voltage, wherein the second-gain resistor is connected between the negative input and the output of the output-op amplifier;

a second-output resistor connected from the trip-point voltage to the reference voltage of the PWM controller for producing the primary voltage.

6. A PWM controller having a frequency modulation to reduce the switching frequency in a light load condition and a no load condition as claimed in claim 1, said trip-point voltage composer has an exemplary circuit comprising:

a sample switch for sampling the voltage in a current-sense-input of the PWM controller, wherein the sample switch is enabled by the sample signal;

a hold capacitor for holding a sensed voltage, which is sampled by the sample switch;

a sense-op amplifier, a sense resistor and a first-VI transistor developing a first V-I converter to convert the sensed voltage to a sensed current, wherein the positive input of the sense-op amplifier is connected to the hold capacitor, the negative input of the sense-op amplifier is connected to the source of the first-VI transistor and the sense resistor, the sense resistor is then tied to the ground, the gate of the first-VI transistor is driven by the output of the sense-op amplifier;

a first-mirror transistor associated with a second-mirror transistor developing a first current mirror, wherein the sensed current drives the input of the first current mirror;

a first constant current source adding the output of the first current mirror to generate an entry current;

a third-mirror transistor associated with a fourth-mirror transistor developing a second current mirror and output a threshold current, wherein the input of the second current mirror is driven by the entry current;

a fb-op amplifier, a fb resistor, and a second-VI transistor developing a second V-I converter to convert the feedback voltage to a feedback current, wherein the positive input of the fb-op amplifier is connected to the hold capacitor, the negative input of the fb-op amplifier is connected to the source of the second-VI transistor and the fb resistor, the fb resistor is then tied to the ground, the gate of the second-VI transistor is driven by the output of the fb-op amplifier;

a fifth-mirror transistor associated with a six-mirror transistor developing a third current mirror and output an edge current, wherein the input of the third current mirror is driven by the feedback current;

a seven-mirror transistor associated with a eight-mirror transistor developing a fourth current mirror, in which the input of the fourth current mirror is driven by the current that is the threshold current subtracts the edge current;

wherein the gain of the fourth current mirror determines the slope of the reduction of the switching frequency corresponding to the decrease of the feedback voltage;

a second constant current source adding the output of the fourth current mirror to generate a trip-point current;

a trip-point resistor associated with the trip-point current to generate the modulated trip-point voltage.

7. A PWM controller having a frequency modulation to reduce the switching frequency in a light load condition and a no load condition as claimed in claim 1, said trip-point voltage composer comprising:

a sample switch, for sampling the voltage in a current-sense-input of the PWM controller, wherein the sample switch is enabled by a sample signal;

a hold capacitor, for holding the sensed voltage, which is sampled by the sample switch;

a buffer amplifier, for amplifying the sensed voltage;

a first adder, for generating the threshold voltage by adding the output of the buffer amplifier and the entry voltage;

a second adder, which equals to the output of the first adder subtracts the feedback voltage;

a slope amplifier for amplifying the output of the second adder;

wherein the gain of the slope amplifier decides the slope of the reduction of the switching frequency corresponding to the decrease of the feedback voltage;

a limiter, for clamping the output amplitude of the slope amplifier;

a third adder, for adding the output of the limiter and a primary voltage, and the output of the third adder is a modulated trip-point voltage for the PWM controller, in which the trip-point voltage decides the switching frequency of the PWM controller;

wherein the primary voltage is a constant that determines the switching frequency in the normal load and high load conditions;

an AND gate, associated with a high-side comparator and a low-side comparator to generate the sample signal, wherein the AND gate includes three inputs, the first input of the AND gate is connected to the pulse signal of the PWM controller, which represents the turn-off of the PWM signal;

the second input and the third input of the AND gate are connected to the output of high-side comparator and the output of low-side comparator;

a high constant voltage is tied to the positive input of the high-side comparator;

a low constant voltage is tied to the negative input of the low-side comparator;

the negative input of the high-side comparator and the positive input of the low-side comparator tied together and then is connected to the RC input of the PWM controller, wherein the RC input is used for connecting the time-constant resistor and the time-constant capacitor for determining the switching frequency.

* * * * *